(12) United States Patent
Sakaguchi

(10) Patent No.: US 10,606,703 B2
(45) Date of Patent: Mar. 31, 2020

(54) MONITORING CIRCUIT

(71) Applicant: ABLIC Inc., Chiba-shi, Chiba (JP)

(72) Inventor: Kaoru Sakaguchi, Chiba (JP)

(73) Assignee: ABLIC INC., Chiba (JP)

( * ) Notice: Subject to any disclaimer, the term of this patent is extended or adjusted under 35 U.S.C. 154(b) by 197 days.

(21) Appl. No.: 15/928,442

(22) Filed: Mar. 22, 2018

(65) Prior Publication Data

US 2018/0276076 A1   Sep. 27, 2018

(30) Foreign Application Priority Data

Mar. 24, 2017   (JP) ................. 2017-059972

(51) Int. Cl.
| | | |
|---|---|---|
| *G06F 11/00* | (2006.01) | |
| *G06F 11/14* | (2006.01) | |
| *G06F 11/07* | (2006.01) | |
| *G06F 11/30* | (2006.01) | |

(52) U.S. Cl.
CPC ...... *G06F 11/1441* (2013.01); *G06F 11/0736* (2013.01); *G06F 11/0757* (2013.01); *G06F 11/3024* (2013.01); *G06F 11/3055* (2013.01); *G06F 11/3089* (2013.01); *G06F 2201/805* (2013.01); *G06F 2201/81* (2013.01); *G06F 2201/82* (2013.01)

(58) Field of Classification Search
CPC ............ G06F 11/0757; G06F 11/0736; G06F 11/1441
See application file for complete search history.

(56) References Cited

U.S. PATENT DOCUMENTS

| 8,350,596 B1 * | 1/2013 | Soh ............... H03K 5/1534 327/20 |
|---|---|---|
| 8,713,367 B2 * | 4/2014 | Deng ............... G06F 11/0757 714/23 |
| 2008/0001631 A1 * | 1/2008 | Fukutoyama ...... H03K 17/005 326/82 |
| 2010/0169752 A1 * | 7/2010 | Kuenemund ........... G11C 7/24 714/811 |
| 2010/0235558 A1 * | 9/2010 | Snead ............... G06F 11/0724 710/267 |
| 2012/0124362 A1 * | 5/2012 | Deng ............... G06F 11/0757 713/2 |

(Continued)

FOREIGN PATENT DOCUMENTS

JP   H07-234806 A   9/1995

*Primary Examiner* — Marc Duncan
*Assistant Examiner* — Jonathan D Gibson
(74) *Attorney, Agent, or Firm* — Brinks Gilson & Lione

(57) ABSTRACT

Provided is a monitoring circuit equipped with a first abnormality detection circuit which detects a first abnormal state of a semiconductor device under surveillance, a second abnormality detection circuit which detects a second abnormal state of the semiconductor device under surveillance, a reset circuit which outputs a reset signal based on a logical sum of a first abnormality detection signal output from the first abnormality detection circuit and a second abnormality detection signal output from the second abnormality detection circuit to a first output terminal, and an output holding circuit which stores which of the first abnormality detection signal and the second abnormality detection signal is supplied, and outputs an abnormality discrimination signal corresponding thereto to a second output terminal.

3 Claims, 5 Drawing Sheets

(56) References Cited

U.S. PATENT DOCUMENTS

2012/0212251 A1* 8/2012 Yanagishima .......... H02P 31/00
   324/762.01
2015/0169424 A1* 6/2015 Vaananen ........... G06F 11/3055
   714/36
2017/0344418 A1* 11/2017 Ueda ...................... G06F 1/30

* cited by examiner

US 10,606,703 B2

MONITORING CIRCUIT

RELATED APPLICATIONS

This application claims priority under 35 U.S.C. § 119 to Japanese Patent Application No. 2017-059972 filed on Mar. 24, 2017, the entire content of which is hereby incorporated by reference.

BACKGROUND OF THE INVENTION

Field of the Invention

The present invention relates to a monitoring circuit which monitors the operation of a microprocessor or the like.

Background Art

A microprocessor has been mounted onto a variety of devices such as a household electrical appliance and an ECU of a vehicle, etc. which are becoming increasingly electronical as well as being mounted for arithmetic processing in an industrial computer and a personal computer.

A monitoring circuit for monitoring the operating status of a microprocessor has been used to prevent a malfunction of an apparatus due to the runaway of the microprocessor. When the monitoring circuit detects a possible runaway of the microprocessor, the monitoring circuit resets the microprocessor to prevent the malfunction of the apparatus. It is common that the monitoring circuit is provided outside the microprocessor to avoid the simultaneous failures of the microprocessor and the monitoring circuit.

FIG. 5 is a block diagram illustrating a related art monitoring circuit.

The related art monitoring circuit 30 is equipped with a watchdog timer circuit 31, a power supply voltage monitoring circuit 32, and a reset signal output circuit 33.

The watchdog timer circuit 31 monitors a time interval of a monitoring pulse output from a microprocessor 40. When the time interval of the monitoring pulse is equal to or more than a setting time, the watchdog timer circuit 31 decides that there is a possibility that the microprocessor 40 has run away, and provides a timeout signal to the reset signal output circuit 33. Further, the power supply voltage monitoring circuit 32 monitors a power supply voltage of a peripheral circuit including the microprocessor 40. When the power supply voltage is reduced and reaches a predetermined voltage or less, the power supply voltage monitoring circuit 32 decides that there is a possibility that the microprocessor 40 has run away, and provides a voltage drop signal to the reset signal output circuit 33.

The reset signal output circuit 33 outputs a reset signal to the microprocessor 40 with the logical sum of the timeout signal output from the watchdog timer circuit 31 and the voltage drop signal output from the power supply voltage monitoring circuit 32, whereby the microprocessor 40 is reset.

Thus, when there is a possibility that the microprocessor 40 has run away, the monitoring circuit 30 is able to prevent an abnormality in the operation of a system including the microprocessor by resetting the microprocessor 40 (refer to, for example, Japanese Patent Application Laid-Open H07-234806).

SUMMARY OF THE INVENTION

In the related art monitoring circuit, however, the signal output therefrom is only the reset signal, and the microprocessor has difficulty in distinguishing the cause of the reset.

The present invention provides a monitoring circuit which enables a semiconductor device such as a microprocessor itself under surveillance to distinguish the cause of the reset.

According to one embodiment of the present invention there is provided a monitoring circuit, having:

a first abnormality detection circuit configured to detect a first abnormal state of a semiconductor device under surveillance;

a second abnormality detection circuit configured to detect a second abnormal state of the semiconductor device under surveillance;

a reset circuit configured to supply a reset signal based on a logical sum of a first abnormality detection signal output from the first abnormality detection circuit and a second abnormality detection signal output from the second abnormality detection circuit to a first output terminal; and an output holding circuit configured to store which of the first abnormality detection signal and the second abnormality detection signal is provided, and supplies an abnormality discrimination signal corresponding thereto to a second output terminal.

According to a monitoring circuit of the present invention, since the cause of the reset of a semiconductor device under surveillance such as a microprocessor is supplied from a second output terminal, the semiconductor device under surveillance itself is capable of distinguishing the cause of the reset.

DETAILED DESCRIPTION OF THE EMBODIMENTS

Embodiments will hereinafter be described by taking a microprocessor for an example of a semiconductor device under surveillance which a monitoring circuit detects an abnormality.

Figure 1:
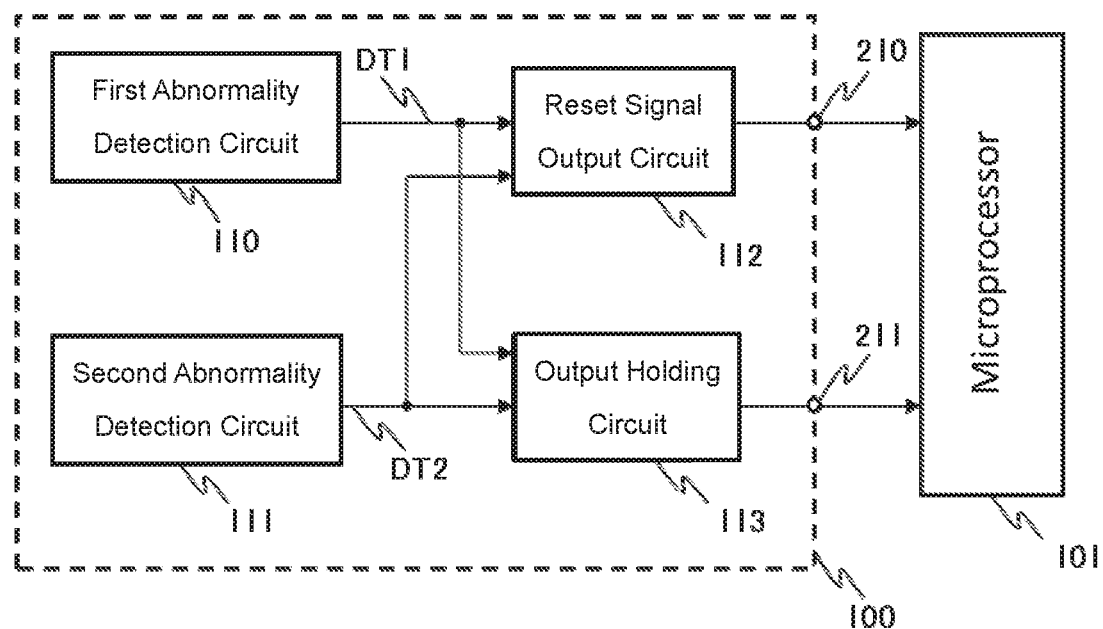
FIG. 1 is a block diagram illustrating a monitoring circuit according to the first embodiment of the present invention.

FIG. 1 is a block diagram illustrating a monitoring circuit according to the first embodiment of the present invention.

The monitoring circuit 100 according to the present embodiment is equipped with a first abnormality detection circuit 110, a second abnormality detection circuit 111, a reset signal output circuit 112, an output holding circuit 113, a first output terminal 210, and a second output terminal 211.

An output terminal of the first abnormality detection circuit 110 is connected to the reset signal output circuit 112 and the output holding circuit 113 respectively through a first abnormality detection signal line DT1. An output terminal of the second abnormality detection circuit 111 is connected to the reset signal output circuit 112 and the output holding circuit 113 respectively through a second abnormality detection signal line DT2. An output terminal of the reset signal output circuit 112 is connected to the first output terminal 210. An output terminal of the output holding circuit 113 is connected to the second output terminal 211.

The first abnormality detection circuit 110 and the second abnormality detection circuit 111 are respectively assumed to detect a possible runaway of a microprocessor 101 with different means. For example, the first abnormality detection circuit 110 is a watchdog timer, and the second abnormality detection circuit 111 is a power supply voltage detection circuit.

When the first abnormality detection circuit 110 detects a possible runaway of the microprocessor 101, the first abnormality detection circuit 110 outputs a first abnormality detection signal to the first abnormality detection signal line DT1. When the second abnormality detection circuit 111 detects a possible runaway of the microprocessor 101, the second abnormality detection circuit 111 outputs a second abnormality detection signal to the second abnormality detection signal line DT2. Here, when the first abnormality detection circuit 110 detects nothing, the first abnormality detection circuit 110 stops the output of the first abnormality detection signal after a first prescribed delay time. When the second abnormality detection circuit 111 detects nothing, the second abnormality detection circuit 111 stops the output of the second abnormality detection signal after a second prescribed delay time.

The reset signal output circuit 112 outputs a reset signal to the first output terminal 210 based on the logical sum of the first abnormality detection signal and the second abnormality detection signal. Accordingly, the monitoring circuit 100 is capable of reliably resetting the microprocessor 101 because the monitoring circuit 100 continues to output the reset signal for the microprocessor 101 to the first output terminal 210 during the first delay time or the second delay time.

When the first abnormality detection signal is provided from the first abnormality detection signal line DT1, the output holding circuit 113 outputs an abnormality discrimination signal of a first level to the second output terminal 211 and holds it therein. And, when the second abnormality detection signal is provided from the second abnormality detection signal line DT2, the output holding circuit 113 outputs an abnormality discrimination signal of a second level and holds it therein. Checking the abnormality discrimination signal to the second output terminal 211 of the monitoring circuit 100 after a release of the reset, the microprocessor 101 is capable of discriminating whether either the first abnormality detection circuit 110 or the second abnormality detection circuit 111 had to operate.

As described above, when the monitoring circuit 100 according to the present embodiment is used, a reliable reset to the microprocessor 101 is made and the cause of the reset can be specified by reading the level of the abnormality discrimination signal of the second output terminal 211 after the release of the reset, thus making it possible to prepare a countermeasure such as initial settings according to the reset causes.

Figure 2:
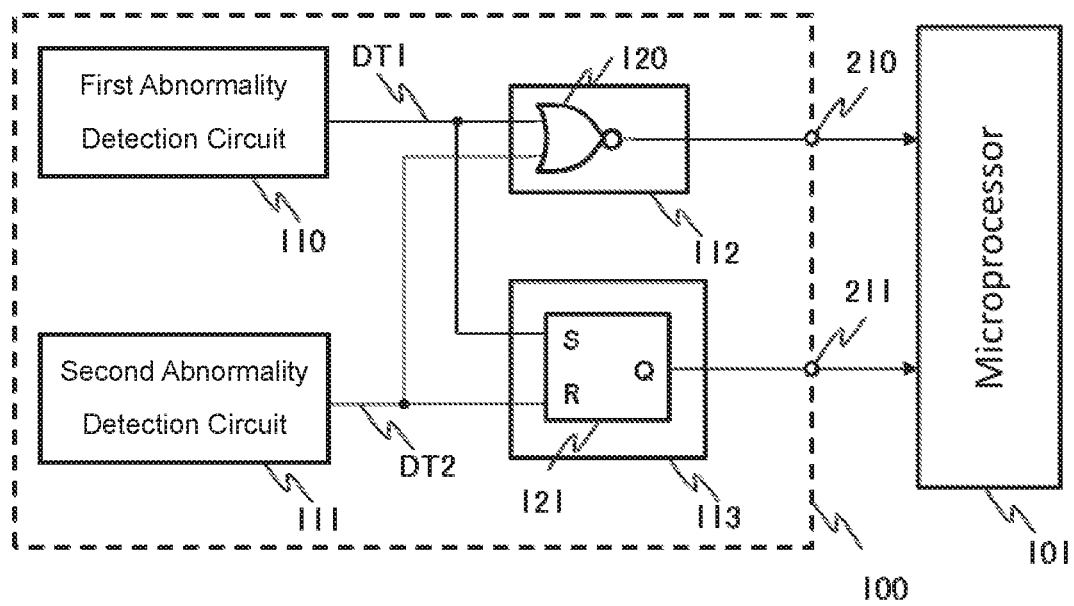
FIG. 2 is a block diagram illustrating one example of a reset signal output circuit and an output holding circuit in the monitoring circuit according to the first embodiment of the present invention.

FIG. 2 is a block diagram illustrating one example of the reset signal output circuit and the output holding circuit in the monitoring circuit according to the first embodiment of the present invention.

The reset signal output circuit 112 is equipped with a NOR circuit 120. The output holding circuit 113 is equipped with a flip-flop circuit 121.

The NOR circuit 120 has a first input terminal connected to the first abnormality detection signal line DT1, a second input terminal connected to the second abnormality detection signal line DT2, and an output terminal connected to the first output terminal 210. The flip-flop circuit 121 has a set terminal S connected to the first abnormality detection signal line DT1, a reset input terminal R connected to the second abnormality detection signal line DT2, and an output terminal Q connected to the second output terminal 211.

The NOR circuit 120 outputs an inverted signal of a logical sum of a first abnormality detection signal and a second abnormality detection signal to the first output terminal 210. When the first abnormality detection signal is provided from the first abnormality detection signal line DT1, the flip-flop circuit 121 is set and thereby outputs an abnormality discrimination signal of a first level (H level) to the second output terminal 211. When the second abnormality detection signal is provided from the second abnormality detection signal line DT2, the flip-flop circuit 121 is reset and thereby outputs an abnormality discrimination signal of a second level (L level) to the second output terminal 211.

By configuring the reset signal output circuit 112 by the NOR circuit in this manner, the reset signal based on the logical sum of the first abnormality detection signal and the second abnormality detection signal can be supplied to the first output terminal 210 by a simple circuit. Further, by configuring the output holding circuit 113 by the flip-flop circuit having the reset terminal and the set terminal, the abnormality discrimination signal can be supplied to the second output terminal 211 by a simple circuit.

Figure 3:
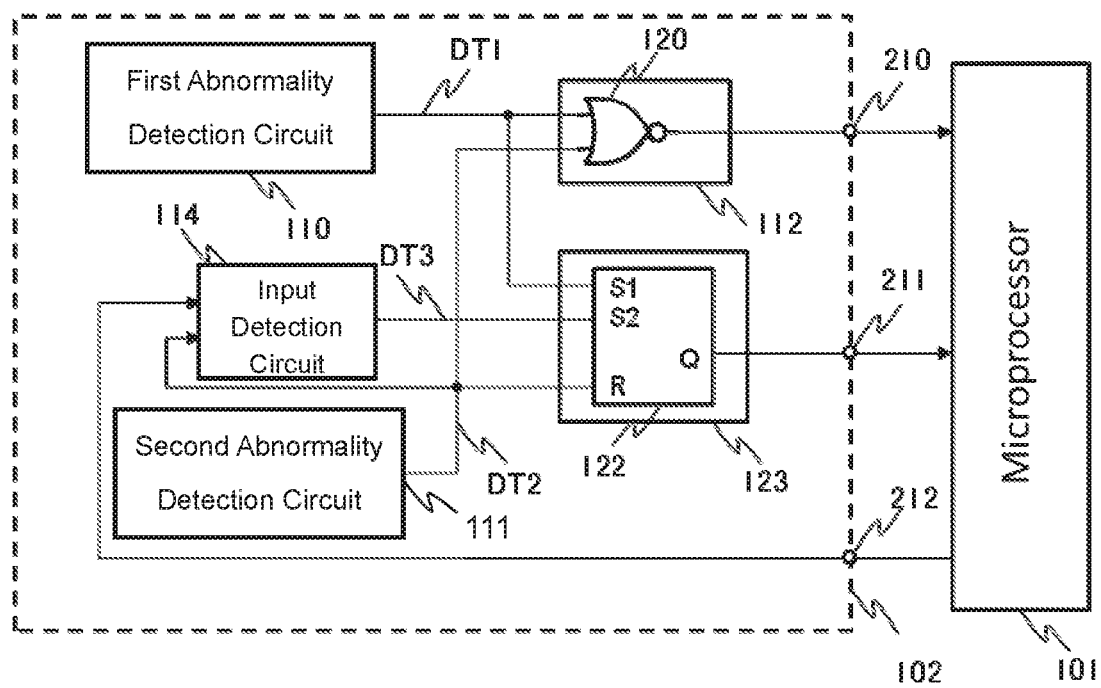
FIG. 3 is a block diagram illustrating an example of the monitoring circuit according to the second embodiment of the present invention.

FIG. 3 is a block diagram illustrating an example of the monitoring circuit according to the second embodiment of the present invention.

In FIG. 3, the same parts as those in FIG. 2 are respectively given the same reference numerals, and their description will be omitted.

The monitoring circuit 102 according to the present embodiment is further equipped with an input detection circuit 114 and an output holding circuit 123 equipped with a flip-flop circuit 122 having two set terminals.

The input detection circuit 114 has a first input terminal connected to a microprocessor 101 through a first input terminal 212, a second input terminal connected to a second abnormality detection signal line DT2, and an output terminal connected to a second set terminal S2 of the flip-flop circuit 122 through an input detection signal line DT3. The flip-flop circuit 122 has a first set terminal S1 connected to a first abnormality detection signal line DT1, and an output terminal Q connected to a second output terminal 211.

When an input signal is provided from the microprocessor to the first input terminal 212 where no second abnormality detection signal is supplied to the second abnormality detection signal line DT2, the input detection circuit 114 outputs an input detection signal to the input detection signal line DT3. When the input detection signal is provided to the second set terminal of the flip-flop circuit 122, the flip-flop circuit 122 is set and thereby outputs an abnormality discrimination signal of a first level to the second output terminal 211. Further, when the second abnormality detection signal is supplied to the second abnormality detection signal line DT2, the input detection circuit 114 does not output the input detection signal to the input detection signal line DT3 even if the input signal is provided from the microprocessor to the first input terminal 212.

A description will be made about an application of the monitoring circuit 102 illustrated in FIG. 3.

When a second abnormality detection circuit 111 detects a possibility of runaway of the microprocessor 101, the second abnormality detection circuit 111 outputs a second abnormality detection signal. Hence, a reset signal is supplied to the first output terminal 210, and an abnormality discrimination signal of a second level is supplied to the second output terminal 211. When the microprocessor 101 detects that the reset is made by the second abnormality detection circuit through the abnormality discrimination signal after the release of the reset, the microprocessor 101 executes prescribed processing corresponding to a possible runaway thereof. When the prescribed processing is completed, the microprocessor 101 outputs an abnormality acknowledge signal to the first input terminal 212 of the monitoring circuit 102. When the abnormality acknowledge signal is provided to the first input terminal, the input detection circuit 114 outputs an input detection signal to the input detection signal line DT3. Accordingly, since the second output terminal 211 outputs an abnormality discrimination signal of a first level, the microprocessor 101 is capable of detecting from the abnormality discrimination signal that a prescribed operation is completed.

Further, even when the abnormality acknowledge signal is provided to the first input terminal while the second abnormality detection signal is provided to the second input terminal, the input detection circuit 114 does not output the input detection signal to the input detection signal line DT3. Accordingly, since the second level is held at the second output terminal 211, the abnormality discrimination signal does not change erroneously during resetting.

As described above, when the monitoring circuit 102 according to the present embodiment is used, it is even possible to monitor that the operation of the microprocessor 101 after the release of the reset has been appropriately set according to the causes of the reset.

Figure 4:
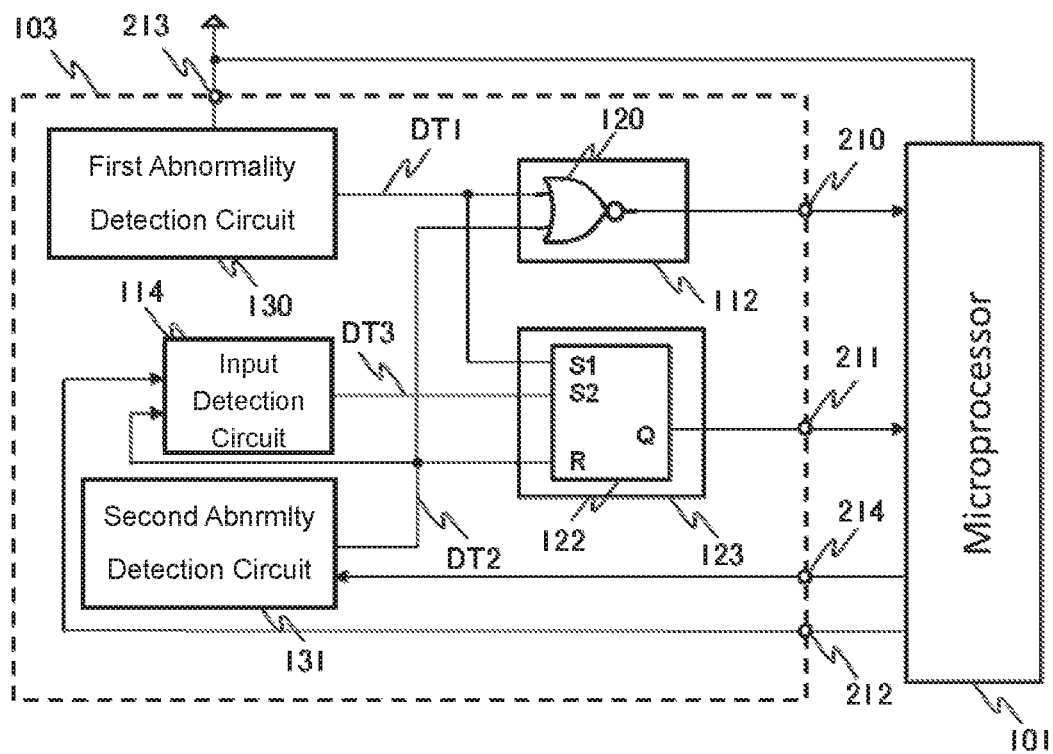
FIG. 4 is a block diagram illustrating an example of the monitoring circuit according to the third embodiment of the present invention.
Figure 5:
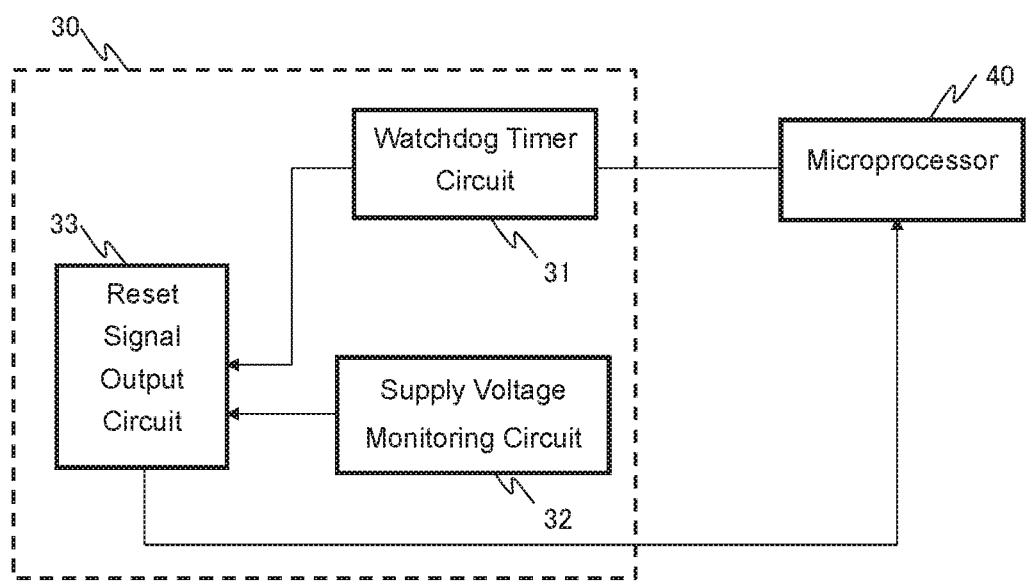
FIG. 5 is a block diagram illustrating a related art monitoring circuit.

FIG. 4 is a block diagram illustrating an example of the monitoring circuit according to the third embodiment of the present invention.

In FIG. 4, the same parts as those in FIG. 3 are respectively given the reference numerals, and their description will be omitted.

A first abnormality detection circuit 130 is connected via a second input terminal 213 to an external power supply being a power supply voltage of a microprocessor 101. A second abnormality detection circuit 131 is connected to the microprocessor 101 through a third input terminal 214.

The monitoring circuit 103 is a connection example effective where the first abnormality detection circuit 130 is configured as a voltage detection circuit which detects an abnormality in the power supply voltage of the microprocessor 101, and the second abnormality detection circuit is configured as a watchdog timer which detects an abnormality of a monitoring pulse input to the third input terminal 214.

When the voltage of the external power supply input from the second input terminal 213 is lowered, the first abnormality detection circuit 130 decides that there is a possible runaway of the microprocessor 101, and outputs a first abnormality detection signal to a first abnormality detection signal line DT1. The second abnormality detection circuit 131 monitors a time interval of the monitoring pulse from the microprocessor, which is provided to the third input terminal 214. When the time interval of the monitoring pulse is a prescribed monitoring time or more, the second abnormality detection circuit 131 decides that there is a possible runaway of the microprocessor 101, and outputs a second abnormality detection signal to a second abnormality detection signal line DT2.

Here, when a possible runaway of the microprocessor is eliminated, i.e., a reduction in the voltage of the external power supply is dissolved, the first abnormality detection circuit 130 stops the output of the first abnormality detection signal after a first prescribed delay time. The second abnormality detection circuit 131 stops the output of the second abnormality detection signal after a second prescribed delay time. Other operations and application examples of the monitoring circuit 103 are similar to those described up to FIG. 3.

The monitoring circuit of the present invention is not limited to the configuration illustrated in the embodiment. It is needless to say that various changes may be made thereto within the scope not departing from the gist of the present invention. For example, the abnormality detection circuit may be configured as a voltage detection circuit which detects a rise in the power supply voltage of the microprocessor 101, or may be configured as a watchdog timer which detects an abnormality by shortening of the time interval of the monitoring pulse output from the microprocessor 101 more than the prescribed monitoring time. Further, the number of the abnormality detection circuits is not necessarily limited to two, and the configuration of the present invention may be applied to a monitoring circuit including three or more abnormality detection circuits.

Further, when the first abnormality detection signal and the second abnormality detection signal are supplied simultaneously, the abnormality discrimination signal of the second output terminal 211 may be configured in such a manner that either the first abnormality detection signal or the second abnormality detection signal is preferentially output, or may be configured in such a manner that a third level different from the first and second levels is supplied.

What is claimed is:

1. A monitoring circuit, comprising:
a first abnormality detection circuit configured to detect a first abnormal state of a semiconductor device under surveillance;
a second abnormality detection circuit configured to detect a second abnormal state of the semiconductor device under surveillance;
a reset circuit configured to supply a reset signal based on a logical sum of a first abnormality detection signal output from the first abnormality detection circuit and a second abnormality detection signal output from the second abnormality detection circuit to a first output terminal; and
an output holding circuit configured to store which of the first abnormality detection signal and the second abnormality detection signal is supplied, and supplies an abnormality discrimination signal corresponding thereto to a second output terminal.

2. The monitoring circuit according to claim 1,
wherein the first abnormality detection circuit stops the output of the first abnormality detection signal after a first delay time,
wherein the second abnormality detection circuit stops the output of the second abnormality detection signal after a second delay time, and
wherein the output holding circuit outputs an abnormality discrimination signal of a first level to the second output terminal after the input of the first abnormality detection signal is stopped, and holds the same therein, and outputs an abnormality discrimination signal of a second level to the second output terminal after the input of the second abnormality detection signal is stopped, and holds the same therein.

3. The monitoring circuit according to claim 2, further comprising an input detection circuit, wherein the input detection circuit has a first input terminal to which a signal from the semiconductor device under surveillance is provided, a second input terminal to which the second abnormality detection signal is provided, and an output terminal which outputs an input detection signal to the output holding circuit according to an input of the signal to the first input terminal, and wherein the output holding circuit outputs an abnormality discrimination signal of a first level to the second output terminal and holds the same therein according to an input of the input detection signal.

\* \* \* \* \*